United States Patent [19]

Gifford

[11] 4,193,562
[45] Mar. 18, 1980

[54] ANTI-REVERSE DEVICE FOR FISHING REEL

[75] Inventor: Richard L. Gifford, Tulsa, Okla.

[73] Assignee: Brunswick Corporation, Skokie, Ill.

[21] Appl. No.: 932,844

[22] Filed: Aug. 11, 1978

[51] Int. Cl.² .............................................. A01K 89/01
[52] U.S. Cl. ................................................ 242/84.2 G
[58] Field of Search ................... 242/84.21 R, 84.2 R, 242/84.21 A, 84.2 B, 84.51 A, 84.5 A, 84.51 R

[56] References Cited

U.S. PATENT DOCUMENTS

| 2,773,655 | 12/1956 | Mandolf | 242/84.21 R |
| 3,138,344 | 6/1964 | Small | 242/84.21 R |
| 3,144,217 | 8/1964 | Wood, Jr. | 242/84.5 A |
| 3,946,963 | 3/1976 | Oberg | 242/84.21 R |
| 4,087,058 | 5/1978 | Yamasaki et al. | 242/84.51 A |

Primary Examiner—Billy S. Taylor
Attorney, Agent, or Firm—John G. Heimovics

[57] ABSTRACT

This invention comprehends a spinning style fishing reel wherein an anti-reverse and a self-centering bail mechanism are jointly incorporated in the housing of the reel. This mechanism provides that the bail of the fishing reel may be located in the same optimum position for casting time after time.

11 Claims, 10 Drawing Figures

ANTI-REVERSE DEVICE FOR FISHING REEL

BACKGROUND OF THE INVENTION

1. Field of the Invention

This invention relates to spinning type fishing reels, and more particularly, relates to a self-centering and anti-reverse mechanism both incorporated into the housing of the reel that permits no more than one counterclockwise rotation of the winding cup.

2. Background of the Prior Art

It is known in the prior art, in limited areas, that it is possible to incorporate an anti-reverse and self-centering bail mechanism into a spinning style fishing reel. This particular mechanism was first employed by the Langley Manufacturing Company about twenty years ago and is taught in U.S. Pat. No. 2,773,655. This particular mechanism was incorporated inside the rotor cup and external to the gear housing of the fishing reel. The Langley device had limited use and constantly caused a problem for fisherman in that in order to use the device a fisherman would have to get his hands in the way of the fishing line. It became obvious that this desirable self-centering and anti-reverse feature should be incorporated in the back housing of a reel to be advantageous to the fisherman. Many spinning reels were made thereafter incorporating the anti-reverse mechanism that was controlled at the rear of the fishing reel but no such device incorporated the self-centering bail feature. This failure of the prior art to teach the incorporation of both an anti-reverse and self-centering bail mechanism has up to now remained unsatisfied.

SUMMARY OF THE INVENTION

This invention relates to a spinning style fishing reel that incorporates an anti-reverse and self-centering bail mechanism that is located within the gear housing of the reel and not within the rotor. By locating the mechanism in the gear housing, the means for bringing the self-centering and anti-reverse feature into operation can be located at the back of the reel out of the way of the line.

It is therefore an object of this invention to provide a self-centering bail mechanism and an anti-reverse mechanism in a spin casting fishing reel that is located within the housing of the reel.

It is another object of this invention to provide such a dual mechanism that can be operated from the back portion of the fishing reel away from the fishing line.

Yet another object of this invention is to provide a simple self-centering bail mechanism whereby the bail can be placed in the same position for casting each time.

Still another feature of the invention is the provision for a silent anti-reverse mechanism whereby the self-centering, anti-reverse mechanism is silent in the retrieve mode.

The above and other and further objects and features will be more readily understood by reference to the following detailed description and the accompanying drawings.

DESCRIPTION OF THE PREFERRED EMBODIMENTS

Figure 1:
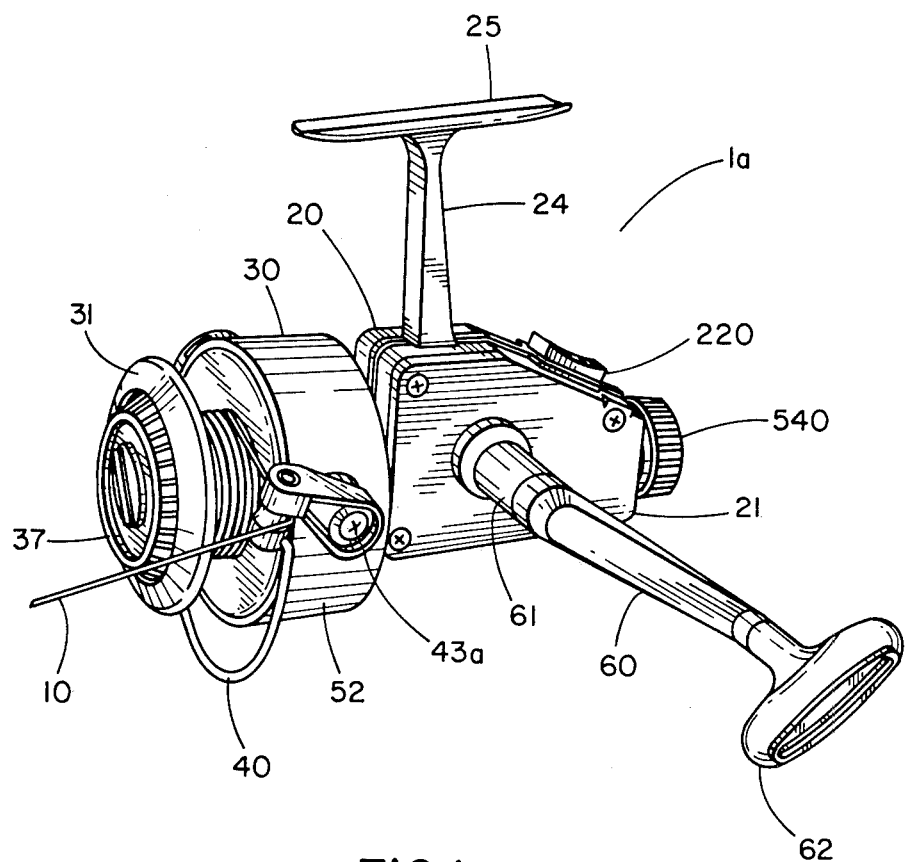
FIG. 1 is a perspective view of the conventional style spinning reel containing the invention described herein.
Figure 2:
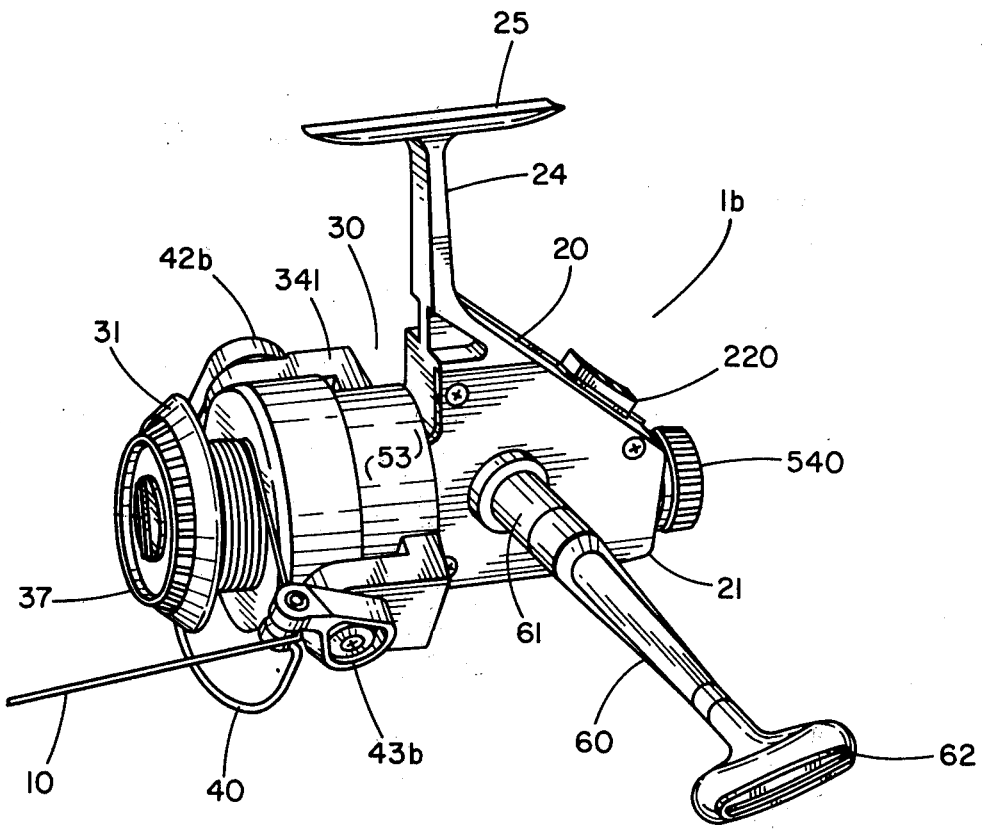
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journaled mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns to crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
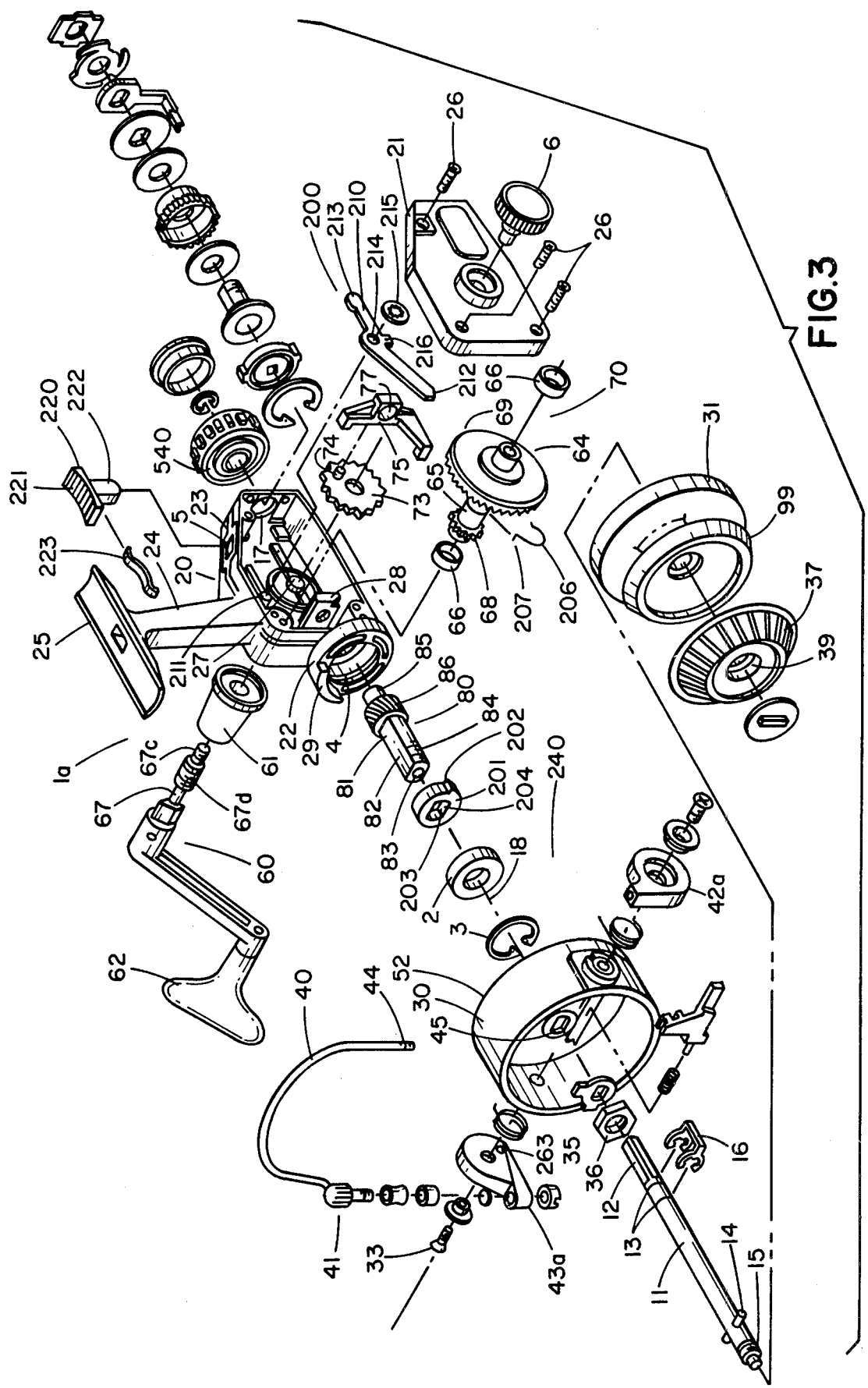
FIG. 3 is an exploded perspective view of the conventional style spinning reel containing the invention described herein.
Figure 4:
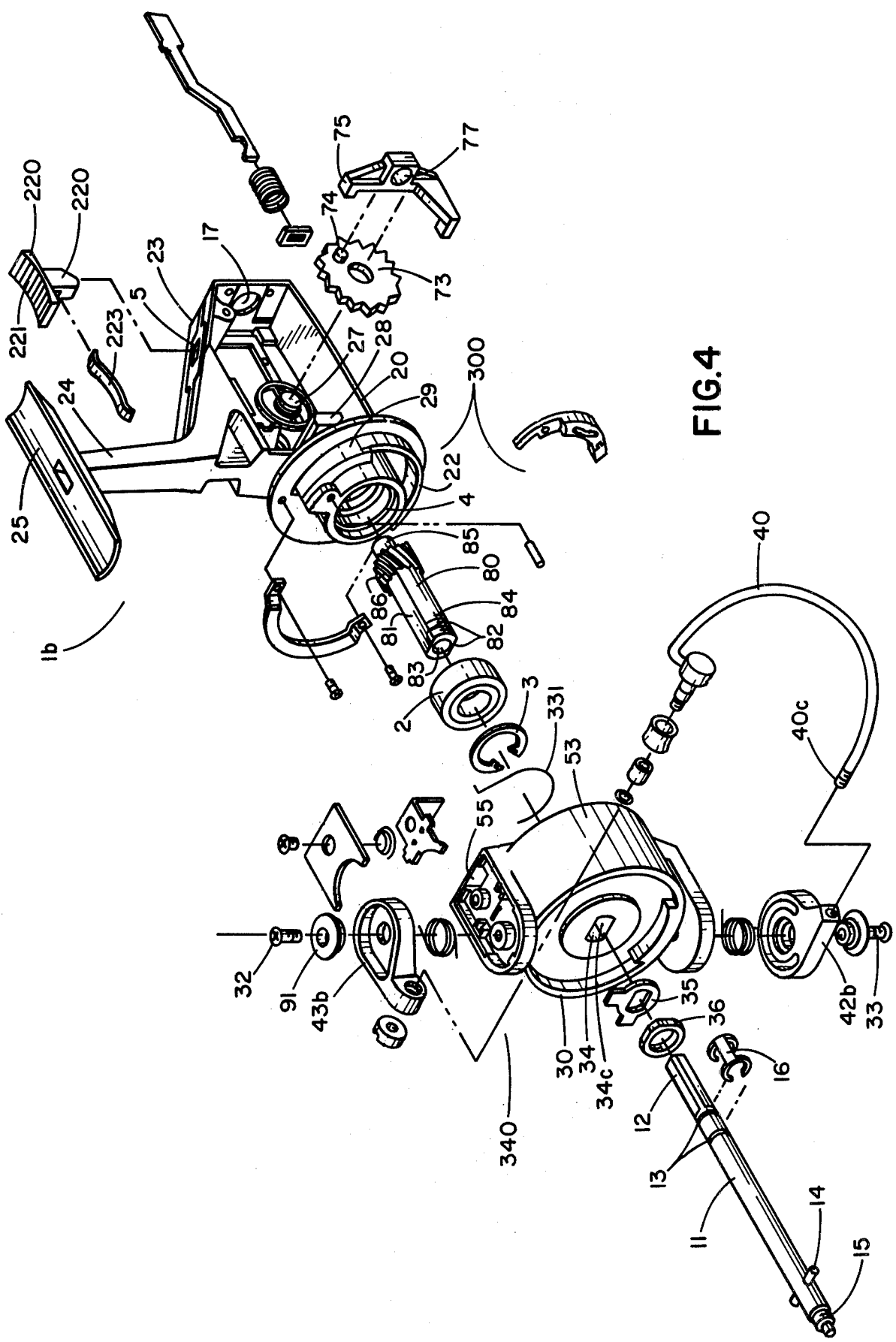
FIG. 4 is an exploded perspective view of the skirted style spinning reel not depicting some of the parts in common with the conventional reel shown in FIG. 3 but capable of incorporating the invention described herein.
Figure 5:
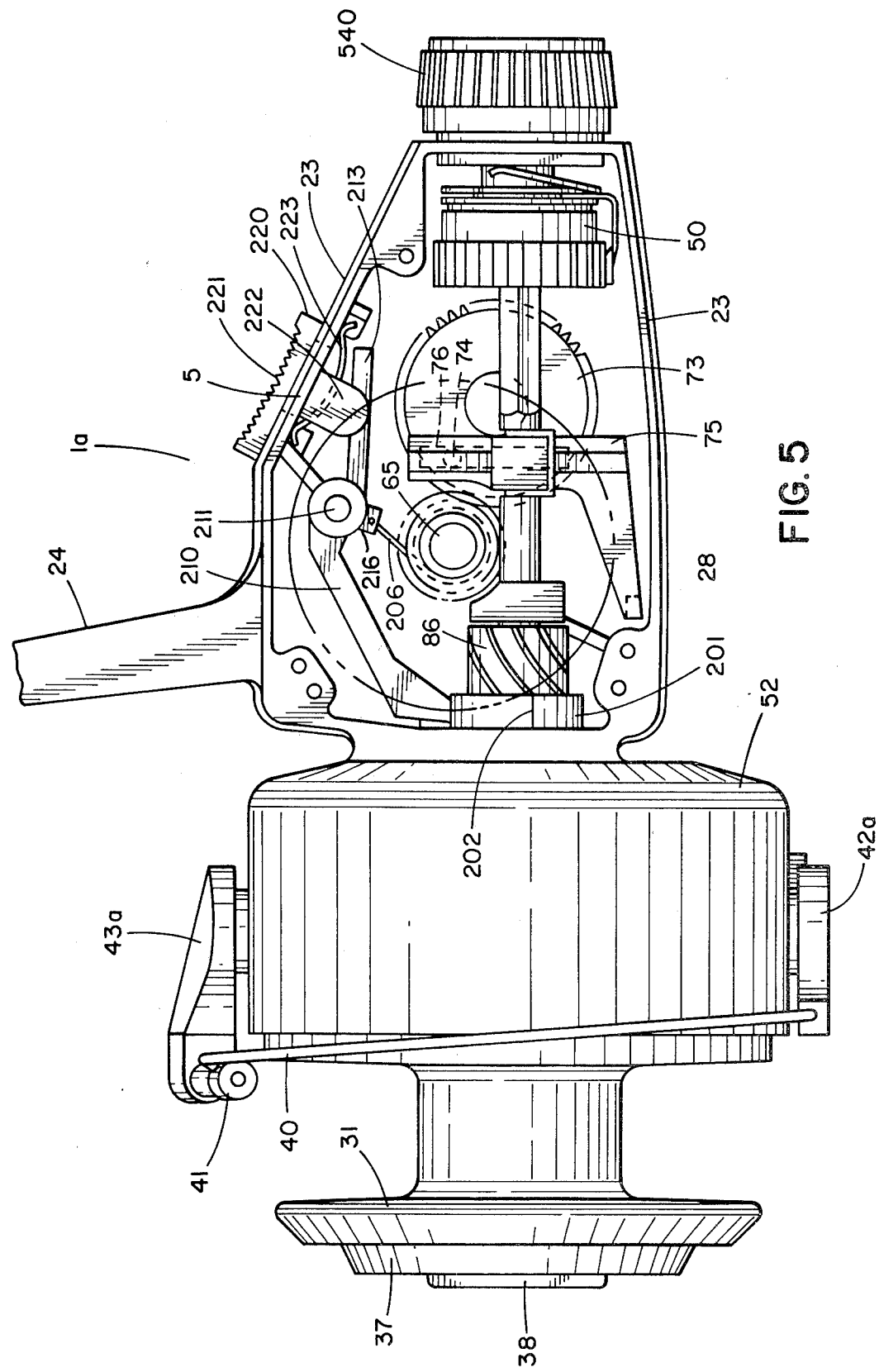
FIG. 5 is a cutaway side view of the conventional style spinning reel depicting the relative location of some of the parts of the reel.
Figure 6:
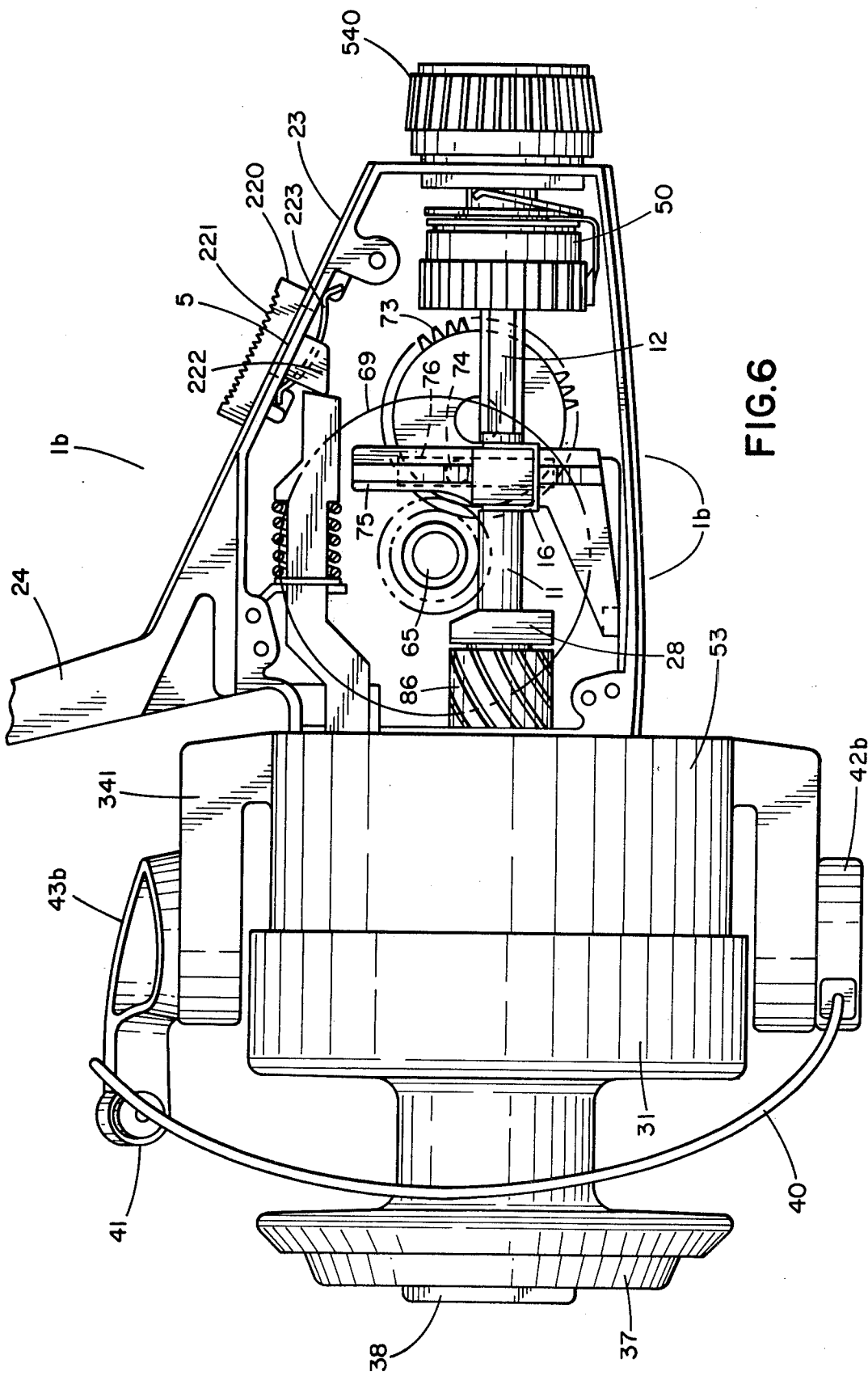
FIG. 6 is a cutaway side view of the skirted style spinning reel depicting the relative location of some of the parts of the reel.
Figure 7:
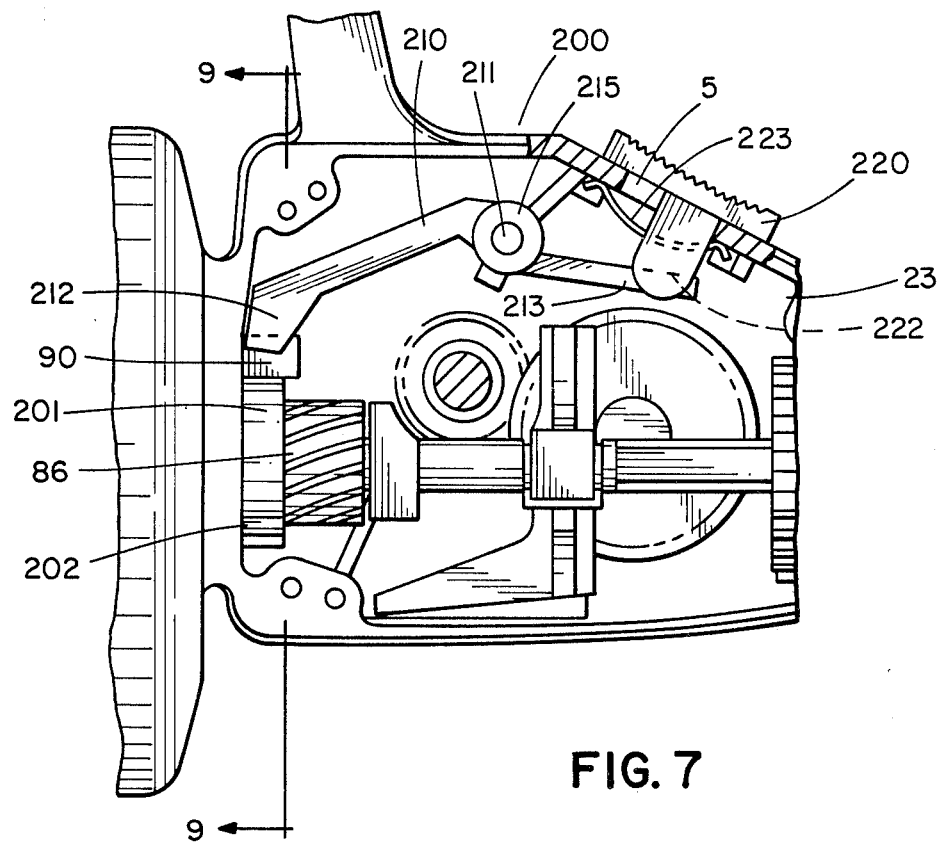
FIG. 7 is a partial cross sectional view of the housing depicting the self-centering bail embodiment of the invention.
Figure 8:
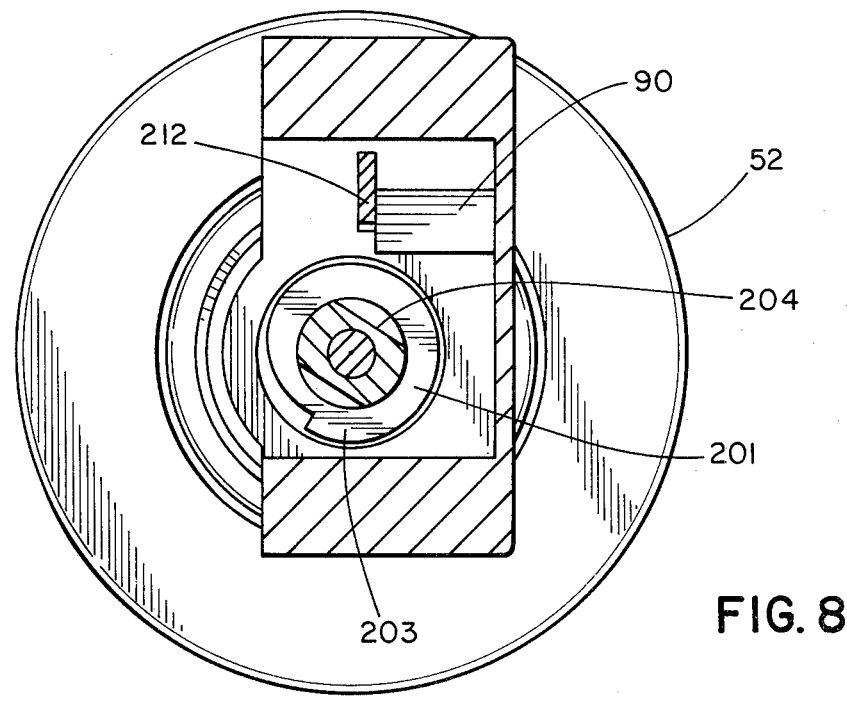
FIG. 8 is a partial sectional view taken of FIG. 7 depicting the relative relationship of the pawl and ratchet.
Figure 9:
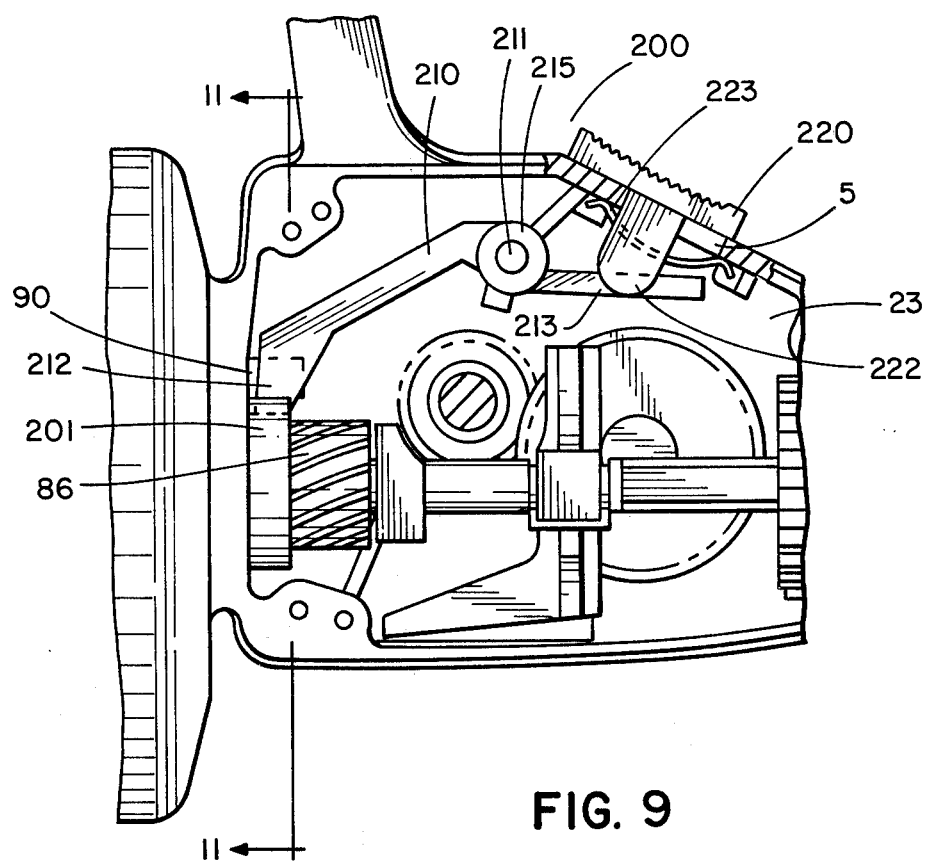
FIG. 9 is a partial cross sectional view of an embodiment of the invention similar to FIG. 7.
Figure 10:
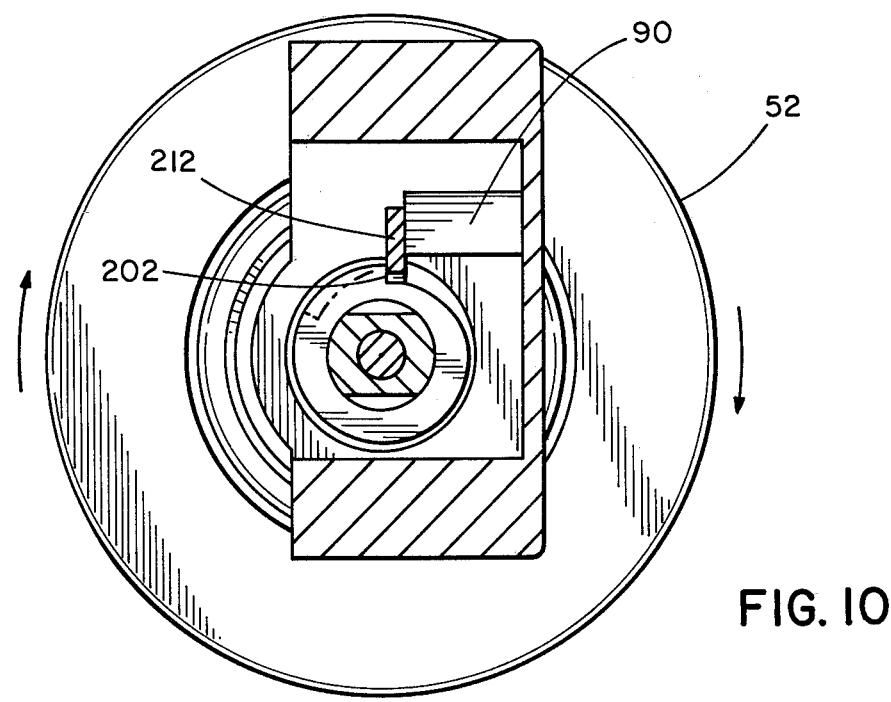
FIG. 10 is a partial cross sectional view taken of FIG. 9 depicting an embodiment of the invention.

A unique feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, 3 and 5, self-centering mechanism 200 is depicted and in the skirted reel 1b as shown in FIGS. 2, 4 and 6, the self-centering mechanism 300 is depicted.

Not only is the anti-reverse and self-centering of the bail necessary, an automatic mechanism that causes the bail to move the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 53 and cooperates with the cam surface 29 on the front of the housing 20.

In the embodiment of the reel 1a shown in FIGS. 1, 3, 5, 7, 8, 9 and 10, an anti-reverse and self-centering bail mechanism 200 utilizes a circular style ratchet 201 having a single tooth 202 and a center hole 203 with flats 204 which is slip fitted over pinion shaft 81 and located inside the gear case 23 between the gear 86 and the bearing 2. A pivot arm 210 is mounted on post 211 that is part of the interior of the gear case 23. Retainer 215 can be pressed on the post 211 to secure the arm 210 from falling off or a small raised portion on the inside of the plate 21 (not shown) can be utilized to accomplish the same effect. The sliding button 220 has a ribbed finger portion 221 exterior of the case 23 and an elongated portion 222 that projects through slot 5 into the interior of the case 23. The button 220 slides forwards and back and is retained in either position by spring 223. In the backward or rearward position, the portion 222 forces the rearward end 213 of the arm 210 in a downward mode and concomitantly causes the pawl or pawl end 212 up (see FIGS. 7 and 8). A bent wire spring 206 clamps into groove 67 on the shaft 65 and has a bent end 207 that slip fits into hole 216. Alternatively, hole 216 may be any desired configuration such as, a notch, projection or the like. The spring 206 causes the arm 210 to pivot in a counterclockwise direction such that the pawl 212 is being urged downward (see FIGS. 9 and 10). In the forward position, the portion 222 permits the pawl 212 to be in a downward position such that it stops the rotor 30 from rotating in a counterclockwise direction (when viewed from the front of the reel) by catching the tooth 202. In this mode, when the handle is turned forward, spring 206 lifts pawl 212 out of engagement with tooth 202 so its does not click every revolution. This is why it is called silent anti-reverse. It is an essential element of the design. The button is the enable/disable control. The spring is the actuator. The pawl support 90, part of the gear case 23, provides positive support for the pawl 212 when it stops the rotor's rotation. When the rotor is in this position, the bail arms 42a and 43a are arranged so that they are approximately vertically aligned with the tooth 202 and the stem 24. In this position, the bail 40 is in the best position for being opened to the casting position. This arrangement has been classically referred to as the self-centering bail feature or arrangement.

Concomitantly when the button 220 is forward, the pawl 212 is in contact with the tooth 202 and prevents the rotor 30 from being cranked or rotated in a counterclockwise direction more than one revolution. Thus, this feature is referred to as the anti-reverse arrangement. However, there is nothing to prevent the rotor 30 from being cranked in a clockwise direction.

Quite contrary to the prior art practice, the J-shaped spring 206 cooperates with the hole 216 to lift the pawl 212 from contact with the tooth 202 in such a manner that this self-centering, anti-reverse feature operates silently in the retrieve mode.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a pinion gear assembly rotatably journaled near the center and in the forward portion of the housing, the pinion gear assembly coaxial with the center shaft and having a bearing stud at one end and a threaded portion at the other end, a handle and gear train assembly mounted on the housing and operable with the pinion assembly, a rotor mounted on the threaded portion of the pinion assembly and rotatable by cooperative movement of the handle and gear train and pinion assembly, and a moveable bail mounted on the rotor having an open casting position and a closed retrieving position, preselected stopped counterclockwise rotation of the rotor provides a self-centering rotor position for opening the bail mechanism comprising;
   (a) a ratchet mounted on the central portion of the pinion gear assembly and rotatable therewith,
   (b) an arm pivotably mounted in the housing, the arm having a rearward end and a forward pawl end, the pawl end in operable association with the ratchet and adjacent thereto, and
   (c) means for assisting the movement of the rearward end of the arm to an upper or lower position which in turn moves the pawl in an opposite lower or upper position, in the lower position the pawl end engagable with the ratchet:
      (1) to prevent the rotation of the rotor in a counterclockwise direction when the reel is viewed from the spool, and
      (2) to provide location of the bail in the most advantageous position for pivoting to the casting position,
   and with the pawl end in the upper position the rotor is free to rotate counterclockwise.

2. The reel of claim 1 wherein the ratchet has a single tooth.

3. The reel of claim 1 wherein the arm has a hole to permit pivotal upper and lower movement of the rearward end and the pawl end.

4. The reel of claim 3 wherein the housing has a stud projecting sideways with the arm mounted thereon at the hole.

5. The reel of claim 1 wherein the housing has an opening adjacent the rearward end.

6. The reel of claim 5 wherein a sliding button is biasably mounted in the housing opening and in operable contact with the rearward end of the arm.

7. The reel of claim 6 wherein the button in the forward position permits the rearward end of the arm to be in the upper position and when the button is in a back position the rearward end is in the lower position.

8. The reel of claim 1 further including a pawl support mounted on the housing.

9. The reel of claim 1 further including means for biasable urging the pawl in a lower position.

10. The reel of claim 9 wherein the biasable means is a spring mounted on the gear train assembly.

11. The reel of claim 1 further including means for silent operation of the reel in the retrieve position.

* * * * *